Dec. 3, 1963 R. B. GELBARD 3,112,619
REFRIGERATOR INCLUDING DEFROST CONTROL MEANS
Filed April 18, 1962 2 Sheets-Sheet 2
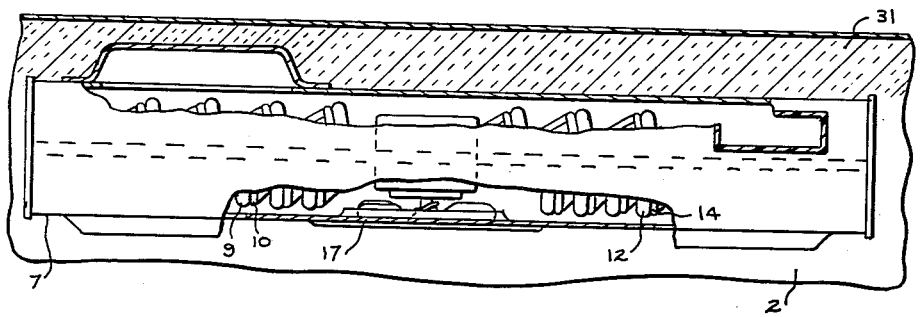
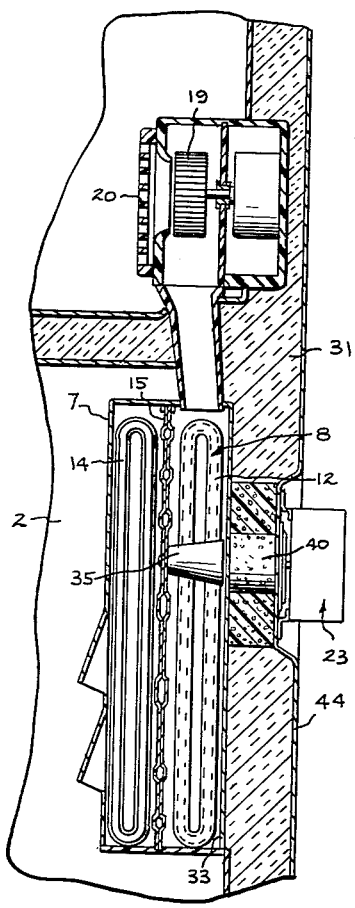
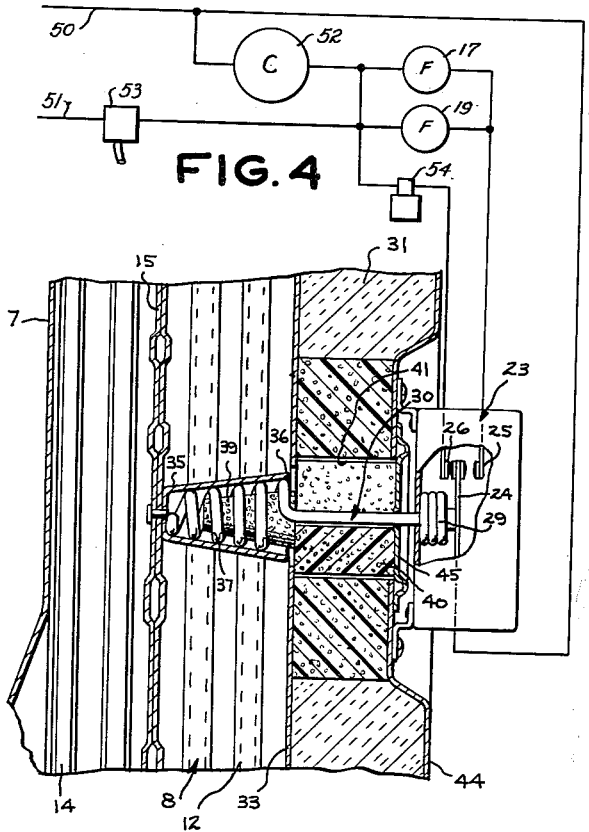
INVENTOR.
ROBERT B. GELBARD
BY
HIS ATTORNEY

United States Patent Office 3,112,619
Patented Dec. 3, 1963

3,112,619
REFRIGERATOR INCLUDING DEFROST CONTROL MEANS
Robert B. Gelbard, Lynden, Ky., assignor to General Electric Company, a corporation of New York
Filed Apr. 18, 1962, Ser. No. 188,370
4 Claims. (Cl. 62—156)

The present invention relates to refrigerators including means for periodically warming the evaporator component thereof to defrosting temperatures and is particularly concerned with improved control means for terminating the defrost cycle.

Various arrangements have been provided for periodically warming the evaporator component of a refrigerator to defrosting temperatures to remove the accumulated frost. Whether the warming means be an auxiliary heater such as an electrical heating unit or means for conducting hot compressed refrigerant from the compressor through or into heat exchange relationship with the evaporator, for efficient operation it is desirable to provide means for terminating the defrost cycle or period as soon as the frost has been removed from the evaporator surfaces. A practical arrangement for detecting a complete removal of the frost is by means of a thermostat including a bellows for actuating a switch and a bulb connected to the bellows and in thermal contact with the evaporator so that the heating or defrost cycle is interrupted as soon as the bulb senses an evaporator temperature sufficiently above freezing to assure complete removal of the frost accumulation. In applying a defrost control which thermally terminates defrost action by means of a pressure actuated bellows operated switch, it is commonly required that an expensive liquid filled bulb be included as the control point in contact with the evaporator. This has been considered necessary because the less expensive vapor filled capillary bellows type of thermostat has the characteristic of controlling from the coldest point in the bellows-capillary system which under some circumstances may not be the point in contact with the evaporator. In other words, even if the sensing portion of the capillary of a vapor filled thermostat in contact with the defrosting evaporator senses a defrost temperature, if any other portion of the capillary is still at a lower temperature, that lower temperature portion will be the effective control point since the vapor-liquid boundary is always established at the point of lowest temperature. Thus the defrost termination will be falsely delayed until all parts of the capillary-bellows system reach defrost termination temperatures. This characteristic of a vapor filled thermostat to control from the coldest part of the capillary-bellows system rather than from a particular and fixed point therein is commonly called "cross ambient error."

It is an object of the present invention to provide a new and improved arrangement whereby a vapor-charged thermostat can be employed for terminating the defrost cycle of an evaporator.

Another object of the invention is to provide a refrigerator including a defrostable evaporator, a vapor filled thermostat for terminating defrost and improved means for preventing cross ambient error in the operation of the thermostat.

Further objects and advantages of the present invention will become apparent as the following description proceeds and the features of novelty which characterize the invention will be pointed out with particularity in the claims appended to and forming part of this specification.

In carrying out the objects of the present invention, there is provided a refrigerator including a cabinet having an exterior wall and an evaporator disposed within the cabinet in spaced relationship with the insulated wall. Means are also provided for periodically warming the evaporator to defrosting temperatures. For the purpose of controlling the defrost operation of the refrigerator or more specifically for terminating the defrost operation, there is provided a control means including a thermostat of the vapor filled bellows-capillary type, the bellows being mounted outside of the cabinet and the capillary tube extending through the insulated wall and having an end portion arranged to sense the temperature of a portion of the evaporator. In order to avoid cross ambient error, there is provided a thermal cup in the form of a conical member of good heat conducting material arranged in the space between the portion of the evaporator and the insulating wall. This thermal cup has its smaller end in direct heat exchange contact with the evaporator and its larger end opening adjacent the insulated wall. The end portion of the capillary tube extending into the cabinet is shaped to conform to the interior of the thermal cup and is disposed within the cup so that substantially all of the capillary tube within the cabinet is contained within the cup. A tapered plug of substantially the same shape as the interior of the cup is provided for wedging the capillary tube end portion into heat exchange contact with the cup and the tapered plug may form part of an insulating closure for sealing the opening in the insulated wall through which the capillary tube extends. Preferably the closure member and tapered plug are composed of a resilient heat insulating material so designed that fastening of the closure member in the opening serves to apply the pressure required to maintain the capillary end portion in contact with the cup surface.

For a better understanding of the invention reference is made to the following description thereof taken in conjunction with the accompanying drawings in which:

FIGURE 2 is a horizontal sectional view taken along line 2—2 of FIGURE 1;

FIGURE 3 is a vertical sectional view taken along line 3—3 of FIGURE 1; and

FIGURE 4 is an enlarged view of a portion of the cabinet illustrated in FIGURE 3.

Figure 1:
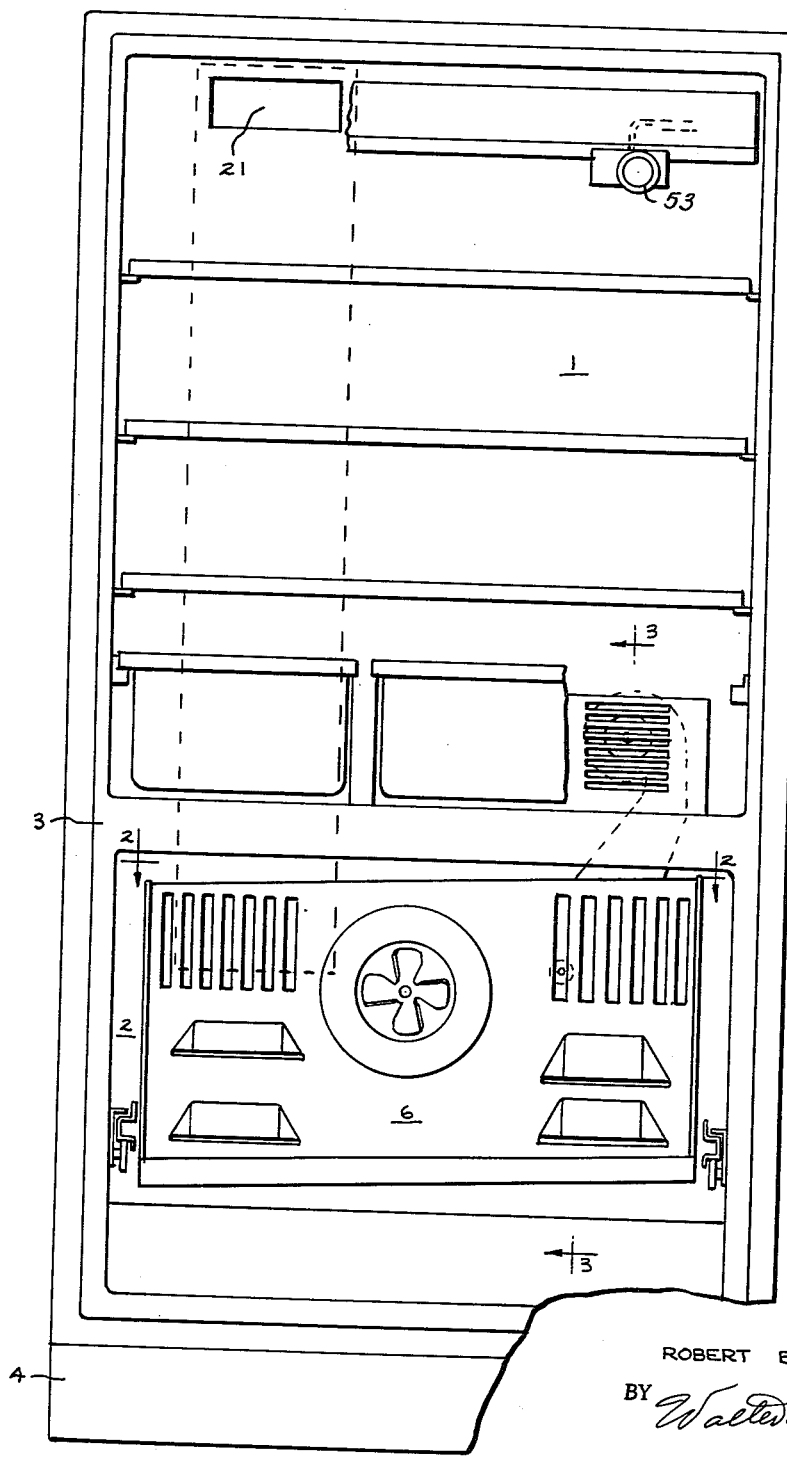
FIGURE 1 is a front elevation, with the closure members removed, of a refrigerator cabinet incorporating an embodiment of the present invention.

While the defrost control arrangement of the present invention is applicable to the control or termination of the defrost cycle of any refrigerator including means for periodically warming the evaporator to defrost temperatures, it will be particularly described with reference to the control of the defrost cycle of a refrigerator of the type described more fully in the copending application of Douglas A. Solley and Kenneth A. Robbie, S.N. 76,538, filed December 19, 1960, now Patent No. 3,050,955, and assigned to the same assignee as the present invention.

With reference to the accompanying drawing, there is shown a refrigerator of this type in the form of a cabinet comprising an upper storage compartment 1 for the storage of fresh or unfrozen foods and a lower or freezer compartment 2 separated from the upper compartment by an insulated partition 3. A motor compressor compartment 4 is provided at the bottom of the cabinet for housing a motor compressor unit and a condenser (not shown). It will be understood that one or more doors are provided for closing the access openings to the storage compartments.

The storage compartments are maintained at the desired refrigerating temperatures by means of air streams circulated over an evaporator unit 6 which is disposed in the rear portion of the freezer compartment 2. As is shown in greater detail in FIGURES 2 and 3 of the drawing, this unit comprises a housing 7 which serves to enclose the evaporator 8 and to separate that evaporator from the contents of the freezer compartment 2. The evaporator 8 comprises a refrigerant tube 9 and a hot gas defrost tube 10 arranged in parallel and in heat exchange relationship with one another. One section of the evaporator indicated by numeral 12 is arranged along the rear wall of the housing 7 and the second section 14 is arranged along the front wall of the housing. These two sections are separated by means of a vertical partition 15. The partition 15 is of a roll forged structure containing both refrigerant passages and hot gas defrost passages and these passages are connected into the refrigerating system so that the partition functions also as an accumulator. Refrigerant passes through the refrigerant tubing 9 forming part of each of the sections 12 and 14 and flows into certain of the passages in the partition 15 which function as an accumulator while hot gas flowing through the defrost or hot gas tubing 10 during defrost operation of the refrigerator is also conducted through various other passages in the partition 15 for warming that partition to defrost temperatures.

For cooling the compartment 2, air is circulated over the evaporator portion 14 and through the freezer compartment 2 by means of a fan 17 arranged in the front wall of the housing 7. Cooling of compartment 1 is accomplished by a blower 19 which withdraws air from the fresh food compartment 1 through an opening 20 and circulates it over the rear portion 12 of the evaporator and back into the fresh food compartment through a duct extending within the wall of the cabinet and having an exit 21 adjacent the top of the storage compartment 1.

During normal refrigerating operation, the evaporator operates continuously at sub-freezing temperatures so that moisture from the air stream circulating over the two evaporator portions or sections and in contact with the accumulator partition deposits thereon in the form of frost. For the purpose of defrosting the unit, hot compressed refrigerant is periodically passed through the frost line or lines 10 and through corresponding tubular portions of the partition 15 employing the defrost circuit more fully described in Patent 2,928,256—Nonomaque, issued March 15, 1960, and assigned to the same assignee as the present invention.

For a further and more complete description of the cabinet and evaporator structure and the operation of the hot gas defrost system, reference may be had to the aforementioned patent application and patent.

The specific control circuitry employed for maintaining the evaporator 8 at sub-freezing temperatures during normal refrigerating operation and for periodically warming the evaporator to defrost temperatures during the defrost cycles and for returning the system to refrigerating operation after defrost cycle may depend upon the type of heating means employed for warming the evaporator to defrost temperatures. In the practice of the present invention, an essential component of the circuit is a thermostat responsive to the temperature of the evaporator being defrosted for terminating defrost operation when the evaporator reaches a temperature above freezing. One such circuit suitable for controlling the operation of the refrigerating system including a particular type of hot gas defrost means is described in detail in the aforementioned Nonomaque Patent 2,928,256.

As employed in the practice of the present invention, the defrost control thermostat generally indicated in FIGURES 3 and 4 of the drawing by the numeral 23 includes a switch for energizing the system for either defrost or normal operation. In the illustrated embodiment there is provided a two position switch 24 in which the switch arm can move either to a normal refrigerating position in engagement with the switch contact 25 or to a defrost position in engagement with a contact 26. When the switch arm is in engagement with the contact 25, the remaining portion of the circuitry is designed to control the operation of the refrigerator in response to the temperature condition within one or both of the storage compartments, as for example, the temperature of the fresh food storage compartment 1. By any suitable means as for example by means of a timer (not shown) the switch arm 24 is periodically moved into engagement with the contact 26 which initiates a defrost cycle characterized by the supply of defrost heat to the evaporator 8. For the purpose of terminating the defrost cycle when the evaporator has warmed to defrosting temperatures, the defrost control includes a vapor filled bellows and capillary tube comprising a bellows 29 and a capillary 30 connected thereto. When the capillary senses a temperature above defrost temperatures, the switch is returned to its normal position in engagement with contact 25.

More specifically, a control circuit for controlling the operation of the refrigerating system including the type of hot gas defrost means described in detail in the aforementioned Nonomaque patent comprises (FIGURE 4) a pair of supply lines 50 and 51 for energizing a compressor 52 forming part of the refrigerating system through a temperature sensing switch 53 (FIGURE 1) responsive to the temperature of the fresh food compartment 1. The defrost control portion of the circuit comprises the defrost control switch 23 for periodically energizing a solenoid valve 54 which controls the flow of hot compressed refrigerant to the evaporator as described in the Nonomaque patent. The switch 53 and the defrost control switch 23 are connected in series to the supply lines 50 and 51 in such a manner that the energization of the solenoid valve 54 is also under the control of the switch 53. It will be seen that this electrical control circuit is designed to permit energization of the solenoid valve 54 only when the switch 53 is also closed to energize the compressor motor so that the valve 54 will open only if the compressor is also energized. When the solenoid valve 54 is energized by movement of the switch arm 24 into engagement with the contact 26, hot compressed refrigerant from the compressor is supplied directly to the defrost lines or portions of the evaporator including the lines 10. During defrost operation of the system, the fans 17 and 19, which are under the control of the switch 23 through the contact 25, are de-energized.

In order that a vapor filled bellows-capillary can be employed for operating switch 24 in response to defrosting evaporator temperatures, the evaporator 8 is mounted adjacent one of the insulated walls 31 and the capillary tube 30 has its end portion extending through the wall 31 and arranged to sense the temperature of a portion of the evaporator which is the last to reach defrosting temperatures. In the illustrated embodiment of the invention, the accumulator partition 15 due to its greater mass, and the fact that it is normally filled or substantially filled with liquid refrigerant in functioning as an accumulator is the last portion of the evaporator structure to reach defrosting temperatures during the defrost cycle.

Even though this portion of the evaporator is the last to reach defrost temperatures, the air temperature between this portion of the evaporator and the inner surface 33 of the insulated wall 31 may be at temperatures which lag the temperature of the partition accumulator 15 during warming thereof. Thus any portion of the capillary 30 exposed to these lagging temperatures will become the controlling point for the vapor filled capillary-bellows system even though a portion of the capillary 30 is in intimate heat exchange relationship with the partition 15. As a result the defrost termination could be falsely delayed until all parts of the capillary-bellows system reach defrost termination temperatures.

To avoid this cross ambient error, a conical cup 35 of high thermal conductivity material such as aluminum or the like is secured to the control point of the evaporator, specifically to the mid section of the partition accumulator 15. The cup 35, preferably of frusto-conical shape, extends from the evaporator control portion substantially to the inner surface 33 of the insulated wall with its larger end 36 opening in the direction of the wall. The inner end portion 37 of the capillary tube 30, that is the portion which is disposed within the space between the evaporator defrost point and the inner surface 33 of the insulated wall, is arranged in the form of a tapered spiral coil or similar configuration so that it can nest snugly in thermal contact with the inner surface of the cup. By this arrangement the cup 35 not only shields the portions 37 of the capillary which would otherwise be exposed to the air between the evaporator and the wall but also provides a good heat conducting path between the defrost point on the evaporator and the length of the capillary tube within the cabinet.

To maintain the capillary in good thermal contact with the interior surfaces of the cup 35, there is employed a tapered resilient plug 39 extending into the spiral or coiled portion 37 of the capillary within the cup in such a manner that it wedges the capillary into contact with the cup. Preferably this resilient plug forms part of a resilient insulating member 40 for closing the opening 41 provided in the insulated wall 31 which is of a size sufficient to receive the coiled capillary end portion 37. The intermediate portion of the capillary 30 between the coiled end portion 37 and the bellows 29 extends through the main portion of the plug 40. The main portion of the member 40 is composed of a resilient insulating material such as sponge rubber, a polyurethane foam or the like and is of sufficient thickness so that when the defrost control 23 is secured to the outer surface 44 of the insulated wall 31, the tapered portion 39 thereof will be wedged into engagement with the coil 37. A plate 45 functions as a capillary seal plate and mechanically closes and seals the outer surface of the insulated wall.

The cup follows the temperature of the evaporator portion to which it is connected with a sufficiently small differential so as to maintain the entire portion of the capillary contained in the cup at a relatively uniform temperature which is always close to that of the evaporator defrost point. Thus the entire portion of the capillary tube within the refrigerator cabinet or compartment follows the temperature of the evaporator defrost point. The portion extending through the insulated wall is sufficiently warmed by ambient temperatures to maintain this portion of the capillary above the defrost termination temperature.

While there has been shown and described a specific embodiment of the present invention, it will be understood that various modifications and changes may be made therein without departing from the spirit of the invention and it is intended by the appended claims to cover all modifications within the true spirit and scope of the invention.

What I claim as new and desire to secure by Letters Patent of the United States is:

1. In combination with a refrigerator comprising a cabinet including a storage compartment having an insulated wall, an evaporator having a portion adjacent to and spaced from said wall and defrost means for periodically warming said evaporator to defrosting temperatures;

control means for terminating operation of said defrost means when said evaporator portion attains an above freezing temperature and comprising a thermostat including a vapor filled bellows mounted outside said compartment and capillary tube connected to said bellows, a conical cup of good heat conducting material arranged in the space between said evaporator portion and said insulated wall and having its smaller end in direct heat exchange contact with said evaporator portion and its larger open end adjacent said insulated wall, said wall having an opening therein opposite said larger end of said cup, said capillary tube extending through said opening with the end portion thereof extending into said cup, said end portion being bent to form a tapered spiral coil of the shape of the inner surface of said cup, and means extending into said cup for maintaining said end portion of said capillary tube in contact with said inner surface of said cup.

2. In combination with a refrigerator comprising a cabinet including a storage compartment having an insulated wall, an evaporator having a portion adjacent to and spaced from said wall and defrost means for periodically warming said evaporator to defrosting temperatures;

control means for terminating operation of said defrost means when said evaporator portion attains an above freezing temperature and comprising a thermostat including a vapor filled bellows mounted outside said compartment and a capillary tube connected to said bellows, a hollow frusto-conical cup of good heat conducting material arranged in the space between said evaporator portion and said insulated wall and having its smaller end in direct heat exchange contact with said evaporator portion and its larger open end adjacent said insulated wall, said wall having an opening therein opposite said open end of said cup, a resilient insulating plug closing said opening, said capillary tube extending through said plug with the end portion thereof extending into said cup, said end portion being spirally formed to the shape of the inner surface of said cup, and tapered insulating means carried by said insulating plug and extending into said cup for maintaining said end portion of said capillary tube in contact with said inner surface of said cup.

3. Defrost control means for the evaporator component of a refrigerator including a cabinet having an insulated wall and an evaporator within said cabinet, said evaporator including a portion spaced from said wall and means for periodically warming said evaporator to defrosting temperatures, said defrost control means comprising:

a conical cup of good heat conducting material substantially bridging the space between said evaporator portion and the inner surface of said wall and having its smaller end in intimate thermal contact with said evaporator portion and its larger open end adjacent the inner surface of said wall, and a pressure actuated thermostat including a bellows arranged outside of said cabinet and a capillary tube extending through said wall and having its end portion in contact with the interior of said cup.

4. Defrost control means for the evaporator component of a refrigerator including a cabinet having an insulated wall and an evaporator within said cabinet, said evaporator including a portion spaced from said wall and means for periodically warming said evaporaor to defrosting temperatures, said defrost control means comprising a frusto-conical cup of good heat conducting material substantially bridging the space between said evaporator portion and the inner surface of said wall and having its smaller end in intimate thermal contact with said evaporator portion and its larger open end adjacent the inner surface of said wall, a pressure actuated thermostat including a bellows arranged outside of said cabinet and a capillary tube extending through said wall and having its end portion in the form of a coil shaped for contact with the interior of said cup, a tapered plug of resilient insulating material extending into said coiled end portion of said capillary tube,
and means for pressing said plug into said end portion for wedging said end portion into contact with said cup.

References Cited in the file of this patent
UNITED STATES PATENTS

| | | |
|---|---|---|
| 1,904,615 | Bristol et al. | Apr. 18, 1933 |
| 2,251,658 | Buchanan | Aug. 5, 1941 |
| 2,716,867 | Jacobs | Sept. 6, 1955 |
| 2,875,614 | Dobrin et al. | Mar. 3, 1959 |